United States Patent
Davis

(10) Patent No.: US 9,624,734 B2
(45) Date of Patent: Apr. 18, 2017

(54) RIG SKIDDING SYSTEM

(71) Applicant: ARDY RIGGING LTD., Valleyview (CA)

(72) Inventor: Rocky E. Davis, Valleyview (CA)

(73) Assignee: Ardy Rigging Ltd., Valleyview (CA)

( * ) Notice: Subject to any disclaimer, the term of this patent is extended or adjusted under 35 U.S.C. 154(b) by 169 days.

(21) Appl. No.: 14/530,459

(22) Filed: Oct. 31, 2014

(65) Prior Publication Data

US 2016/0115741 A1    Apr. 28, 2016

(30) Foreign Application Priority Data

Oct. 24, 2014  (CA) .................................... 2869252

(51) Int. Cl.
| | | |
|---|---|---|
| *B63C 3/00* | (2006.01) |
| *B63C 3/08* | (2006.01) |
| *B65G 7/00* | (2006.01) |
| *F16C 29/02* | (2006.01) |
| *F16C 29/00* | (2006.01) |
| *E21B 15/00* | (2006.01) |
| *B65G 7/02* | (2006.01) |
| *B66F 1/00* | (2006.01) |
| *B62D 55/00* | (2006.01) |
| *F16C 32/06* | (2006.01) |

(52) U.S. Cl.
CPC ............ *E21B 15/003* (2013.01); *B62D 55/00* (2013.01); *B63C 3/08* (2013.01); *B65G 7/02* (2013.01); *B66F 1/00* (2013.01); *F16C 29/025* (2013.01); *F16C 32/06* (2013.01); *B65G 2813/02* (2013.01)

(58) Field of Classification Search
CPC .......... E21B 15/003; B66F 1/025; B66F 1/08; A47B 91/06; B65G 7/02; B65G 25/04; Y10T 16/209; B63B 25/22

USPC .................. 104/134, 31; 105/162; 108/51.3; 16/42 R; 180/124, 125, 182; 193/38; 238/10 R, 13; 414/12, 661, 800; 62/267

See application file for complete search history.

(56) References Cited

U.S. PATENT DOCUMENTS

| | | | | |
|---|---|---|---|---|
| 2,815,252 A | * | 12/1957 | Baker .................... | A47B 88/12 156/249 |
| 3,105,583 A | * | 10/1963 | Svensson .................. | B63C 3/08 193/38 |
| 3,486,737 A | * | 12/1969 | Campbell ............... | B66F 1/025 254/106 |

(Continued)

FOREIGN PATENT DOCUMENTS

CA    2 766 058 A1    11/2009

OTHER PUBLICATIONS

"Quadrant Engineering Plastic Products: Quadrant EPP TIVAR® DrySlide UHMW-PE Lubricant Filled, Electro Static Dissipative, UV Stabilized (ASTM Product Data Sheet)," Reading, Penn., at least as early as Sep. 2014, 2 pages.

(Continued)

*Primary Examiner* — Gregory Adams
(74) *Attorney, Agent, or Firm* — Christensen O'Connor Johnson Kindness PLLC

(57) ABSTRACT

A rig skidding method involving raising a rig on jacks, positioning skid tracks comprising low friction plastic underneath the rig, lowering the rig, and skidding the rig along the skid tracks to a new site for rig operations. At the new site, the process is reversed to leave the rig on the ground at the new location.

19 Claims, 6 Drawing Sheets

(56) References Cited

U.S. PATENT DOCUMENTS

| | | | | |
|---|---|---|---|---|
| 3,599,808 A | * | 8/1971 | Bisson | B62D 53/067 |
| | | | | 238/13 |
| 3,840,221 A | * | 10/1974 | Hogan | A61B 6/04 |
| | | | | 108/143 |
| 4,014,266 A | * | 3/1977 | Naslund | B65G 7/02 |
| | | | | 104/134 |
| 4,283,890 A | * | 8/1981 | Takeda | E04H 5/02 |
| | | | | 108/51.11 |
| 4,544,135 A | | 10/1985 | Albaugh | |
| 5,057,356 A | * | 10/1991 | Smith | A47B 91/06 |
| | | | | 16/42 R |
| 5,211,114 A | * | 5/1993 | Chaplin | E21B 15/003 |
| | | | | 104/134 |
| 5,492,436 A | | 2/1996 | Suksumake | |
| RE35,468 E | * | 3/1997 | Newman | A61G 7/103 |
| | | | | 5/625 |
| 5,911,179 A | * | 6/1999 | Spiczka | B65D 19/0095 |
| | | | | 108/51.11 |
| 6,581,525 B2 | * | 6/2003 | Smith | B62D 55/00 |
| | | | | 104/96 |
| 6,901,629 B2 | * | 6/2005 | Wurdack | A47B 91/002 |
| | | | | 16/42 R |
| 7,431,552 B2 | * | 10/2008 | Laursen | B65G 7/06 |
| | | | | 180/125 |
| 8,561,685 B2 | | 10/2013 | Rodgers | |
| 2014/0041855 A1 | | 2/2014 | Rodgers | |

OTHER PUBLICATIONS

"Drilling Rig Skidding System," Veristic Manufacturing, Inc., New Caney, Tex., at least as early as Aug. 2009, <http://vengineer.com/rig-skidding-system/html> [retrieved Aug. 20, 2014], 2 pages.

Statement by Applicant dated Oct. 18, 2016, 1 page.

\* cited by examiner

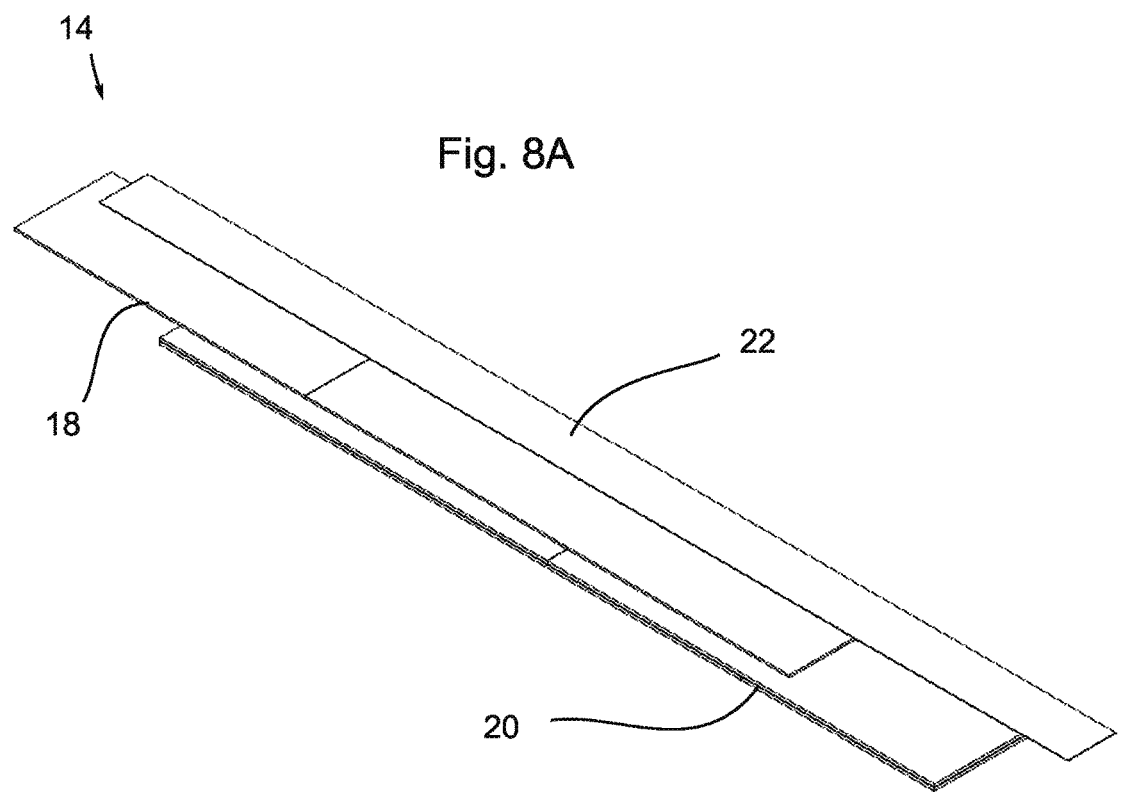
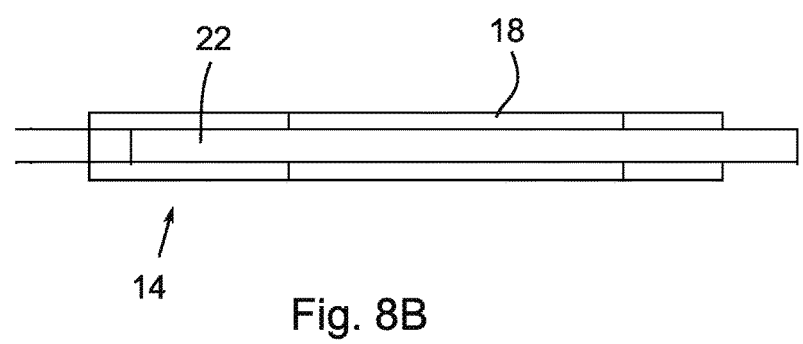

RIG SKIDDING SYSTEM

TECHNICAL FIELD

Rig skidding apparatus and method.

BACKGROUND

It is often desirable to move drilling rigs short distances between wells within a drill site. Disassembling the rig and reassembling it at the new location is time and labor intensive, and increases the rate of wear of some rig components. To avoid disassembly and reassembly, one solution has been to skid the rig structure across steel framed rig matting. However, the force required to overcome the metal-to-metal sliding friction between rig and track was problematic. Other solutions have included sliding the rig on rollers and using rig walkers.

SUMMARY

It is desired to achieve a means of moving a rig structure to a well site without requiring extensive disassembly of the rig structure that is labor and time efficient.

In one embodiment, there is disclosed a method of skidding a rig structure, comprising raising the rig structure; after raising the rig structure, placing a skid track under the rig structure, wherein the skid track comprises a low friction plastic sheet; lowering the rig structure onto the skid track; and sliding the rig structure along the skid track. The low friction plastic sheet may be supported by a base and the skid track may comprise a cooperating sheet, for example a continuous flexible metal sheet, placed between the plastic sheet and the rig structure. In one embodiment, there is disclosed a method of skidding a rig structure comprising placing beams in a position to support the rig structure; using jacks to raise the beams; raising the rig structure with the jacks; placing a skid track under the rig structure; lowering the rig structure onto the skid track; removing the jacks and the beams; and sliding the rig structure along the skid track, wherein the skid track comprises a low friction plastic sheet.

In various embodiments, there may be included any of the following features: upon sliding the rig structure to a desired location, placing beams in a position to support the rig structure; using jacks to raise the one or more beams, raising the rig structure with the jacks, removing the skid track from under the rig structure, lowering the rig structure and removing the jacks; sliding the rig structure along the skid tracks may occur by towing; the low friction plastic sheet may be a lubricant filled plastic sheet; the low friction plastic sheet may be self-lubricating; and the low friction plastic sheet may be ultra-high-molecular-weight polyethylene.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 8A, 8B and 8C are respectively a perspective exploded view, a top view and an exploded section of an exemplary skid track.

DETAILED DESCRIPTION

Immaterial modifications may be made to the embodiments described here without departing from what is covered by the claims.

Figure 9:
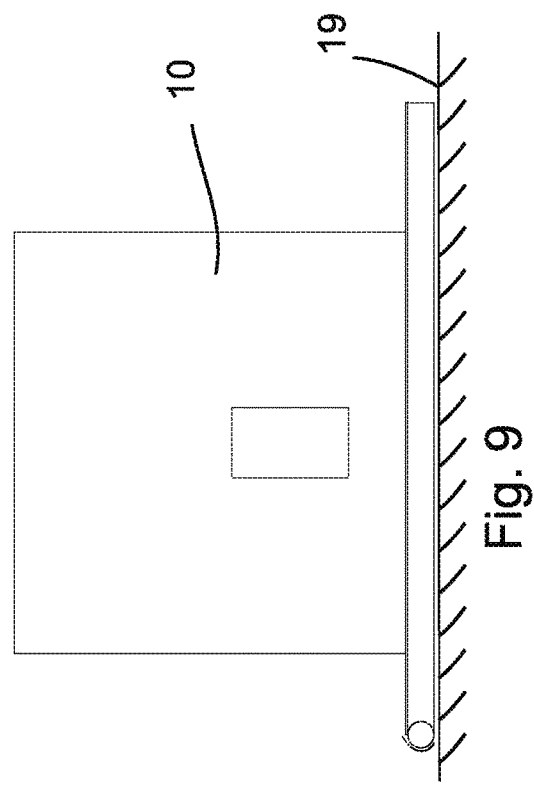
FIG. 9 shows a rig structure resting on a ground surface.

At the beginning and end of moving a rig, the rig rests on the ground as shown in FIG. 9. Removal and later replacement of catwalks and related peripheral equipment will also be carried out. The rig is represented by rig structure 10, which comprises conventional elements of a rig. The rig structure 10 comprises a ground contacting portion on which the mast, power sources, pumps, drill pipe, etc., are carried. The ground contacting portion may comprise I-beams. When preparing to move the rig structure 10, a set of jacks 12 are arranged to support the rig structure 10 while the skid tracks 14 are positioned underneath it, for example, under the I-beams if the rig structure 10 is supported on I-beams. The jacks 12 may, for example, be hydraulic jacks. In an embodiment beams 16 are placed through portions of the rig structure 10, resting upon the jacks 12. The jacks 12 are activated, raising the beams 16 and with them the rig structure 10 (see FIGS. 2 and 3). The beams 16 may in some embodiments be fabricated aluminum beams. The rig structure 10 only needs to be raised sufficiently to place the skid tracks 14 underneath the rig structure 10. Only a few inches of clearance may be required.

Once the rig structure 10 has been raised off the ground, skid tracks 14 are slid underneath those portions of the rig structure which would contact the ground surface 19 when lowered. The ground surface 19 may be any surface on which the rig rests including a manufactured or prepared surface such as conventional rig matting. The skid tracks 14 include a sliding layer 18 of continuous or sectioned low friction plastic sheet (see FIGS. 8A, 8B and 8C for construction of an exemplary skid track 14). In an embodiment, this plastic sheet is a sheet or sheets of ultra-high-molecular-weight polyethylene (UHMW-PE) such as TIVAR® DrySlide UHMW-PE produced by Quadrant Engineering Plastic Products. The sliding layer 18 may comprise a porous polymer having pores that include a lubricant. The particular plastic used for the sliding layer 18 should be selected for appropriate strength, corrosion resistance, and abrasion resistance. The lubricant may be a dry film lubricant or solid, such as PTFE, molybdenum disulfide, or graphite, selected for compatibility with the plastic.

Figure 8C:
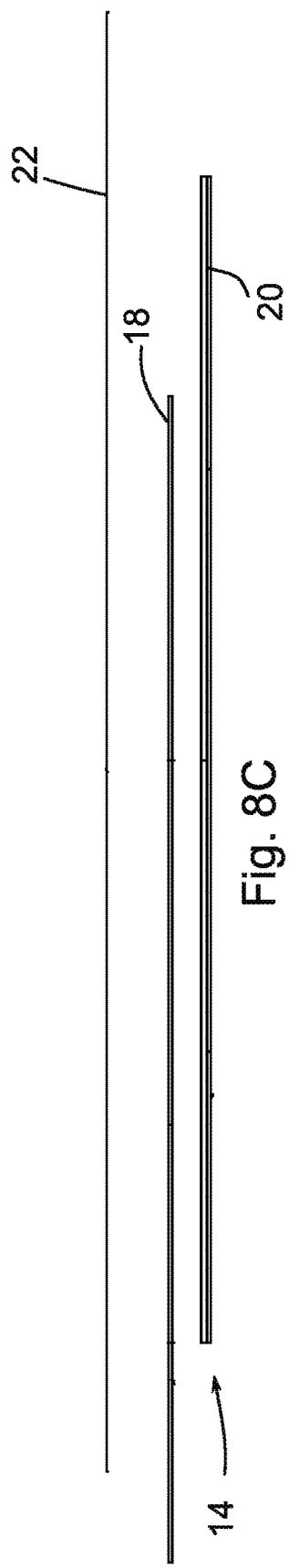

As shown in FIGS. 8A, 8B and 8C, in some embodiments, the layer 18 is supported by a base 20, for example a layer of plywood sheets. The base 20 may be formed of overlapping plywood sheets, for example two layers of overlapping 8 foot long ¾ inch×24 inch sheets screwed together at 6 inch intervals. A cooperating layer 22 of stainless steel sheet may be placed between the rig structure and the sliding layer 18. The cooperating layer 22 may be a continuous flexible metal sheet. Continuous in this context means extending the full distance along the ground engaging part of the rig structure. Flexible in this context means sufficiently flexible that the continuous sheet can be placed under the rig structure when the rig structure is raised off the ground by jacks. In an embodiment, the layer 22 may be a continuous sheet of 16-gauge 304 annealed stainless steel, 12 inches wide. The layer 22 may run the length of the rig structure or more. The layer 22 may be secured to the front of the rig structure 10 by any suitable means, so that the layer 22 moves with the rig structure 10 when it is towed. For example, if the rig structure 10 has a tubular or other element connecting I-beams, the layer 22 may be bent around the tubular element to hold the layer 22 stationary in relation to the rig structure 10. It may be sufficient in some cases that the friction between the layer 22 and the ground contacting portions of the rig structure 10 is sufficient to cause the layer 22 to move with the rig structure 10 when it is moved.

In an embodiment, the sliding layer 18 may be ½ inch thick. The sliding layer 18 may be the same width as or narrower than the base 20. The cooperating layer 22 may be as wide as the ground contacting parts of the rig structure. The layer 22 may be narrower than the layer 18. The layer 18 may be provided in sections 24 inches wide. The layer 18 may be screwed onto the base 20. A dry film coefficient of friction of 0.08 between the layers 18 and 22 has been found adequate, for example, as occurs between TIVAR® DrySlide UHMW-PE used as the sliding layer 18 and stainless steel used as the cooperating layer 22 but other levels of friction may be adequate depending on the towing ability of a vehicle used to pull the rig structure and the integrity of the rig structure 10 at the tow points. With the skid tracks 14 in position, the rig structure 10 may then be lowered onto the skid tracks 14 with the rig structure 10 contacting the cooperating layer 22 when present or the sliding layer 18 (see FIGS. 4 and 5).

Figure 4:
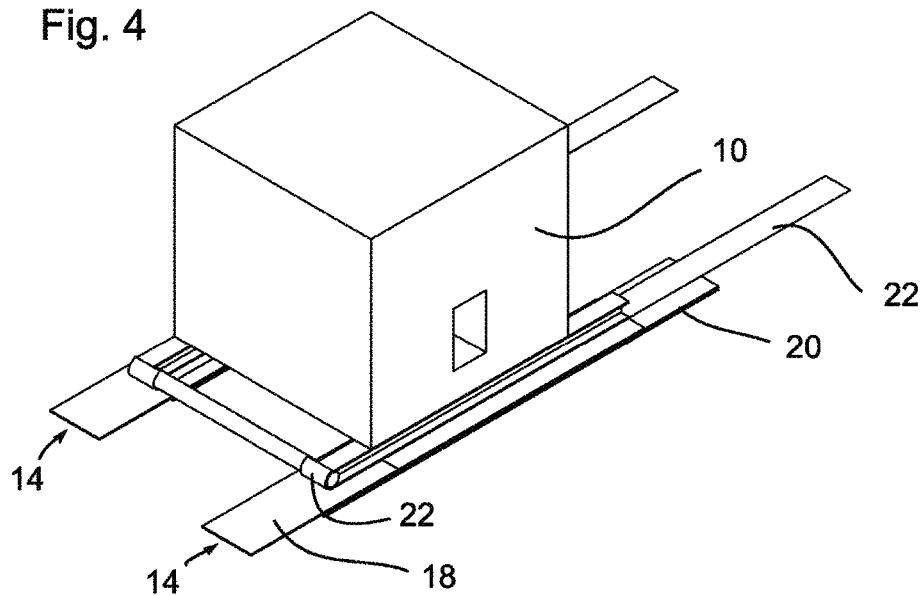
FIG. 4 is a perspective view of a portion of a rig structure lowered onto skid tracks with a cooperating layer in this instance comprising a metal sheet.
Figure 5:
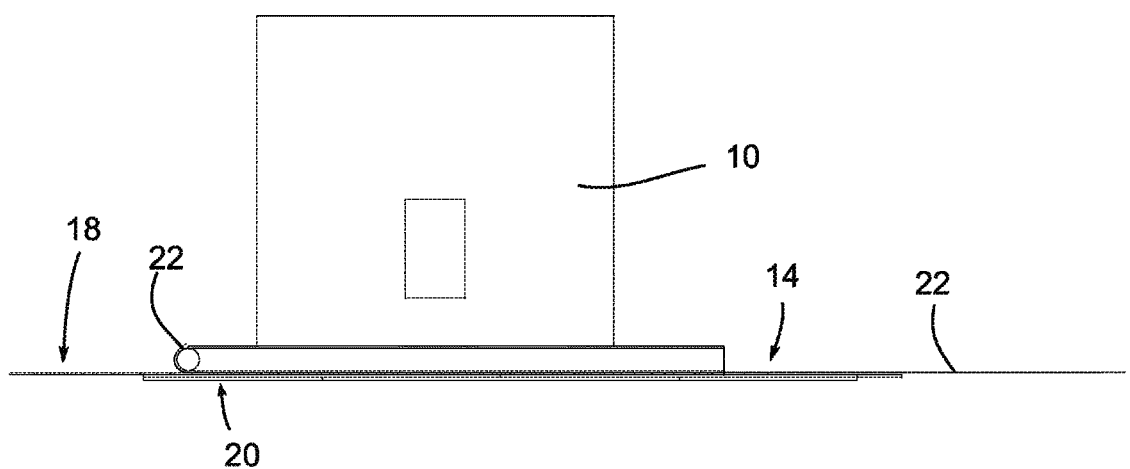
FIG. 5 is a side view of a portion of a rig structure lowered onto skid tracks.
Figure 6:
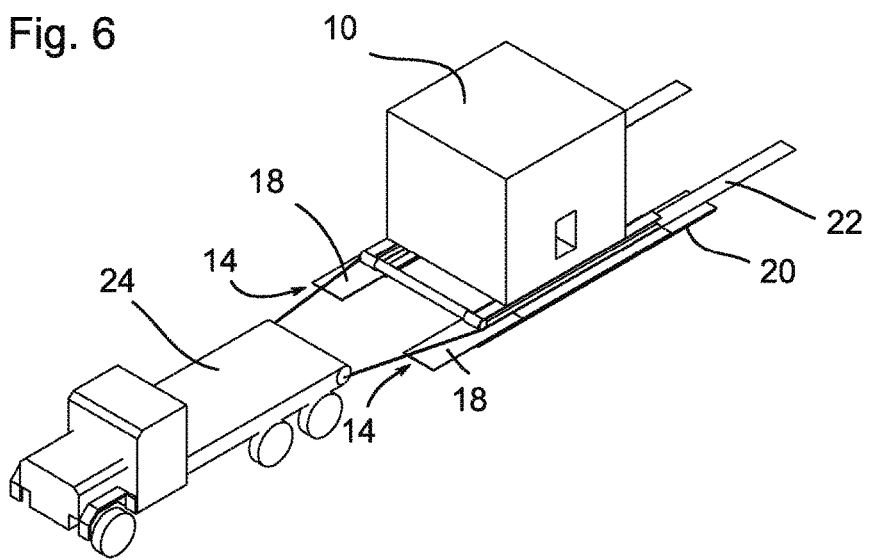
FIG. 6 is a perspective of a representative portion of a rig structure being towed on skid tracks, with beams and jacks removed.
Figure 7:
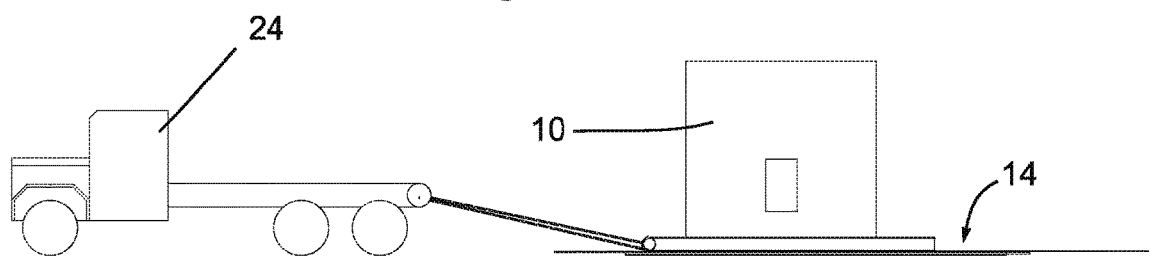
FIG. 7 is a side view of a representative portion of a rig structure being towed on skid tracks, with beams and jacks removed.

Once the weight of the rig structure 10 is off of the jacks 12, the beams 16 and jacks 12 may be removed (as shown in FIGS. 4 and 5). The rig structure 10 is then connected to be pulled or pushed along the skid tracks 14 (FIGS. 6 and 7). In a preferred embodiment the rig structure 10 is towed by one or more vehicles 24. Additional vehicles (not shown), positioned alongside or behind the rig structure can also be used to stabilize the rig structure on the skid tracks.

When towed, the rig structure slides on the sliding layer 18, usually with the sliding interface being between the plastic sheet forming the sliding layer 18 and the cooperating layer 22 formed of stainless steel. The plastic sheet such as sheets of UHMW-PE are self-lubricating, thereby significantly reducing the sliding friction despite the substantial weight of the rig structure. In an embodiment, the cooperating layer 22 moves in relation to the sliding layer 18, while the rig structure remains stationary with respect to the cooperating layer 22. In this instance, the important coefficient of friction for sliding purposes is the coefficient of friction between the sliding layer 18 and the cooperating layer 22. Depending on the rig structure base, the cooperating layer 22 could be omitted in some circumstances, but it is recommended to use a cooperating layer 22 in most instances. Instead of a metal cooperating layer 22, other smooth and strong cooperating layers may be used.

Figure 1:
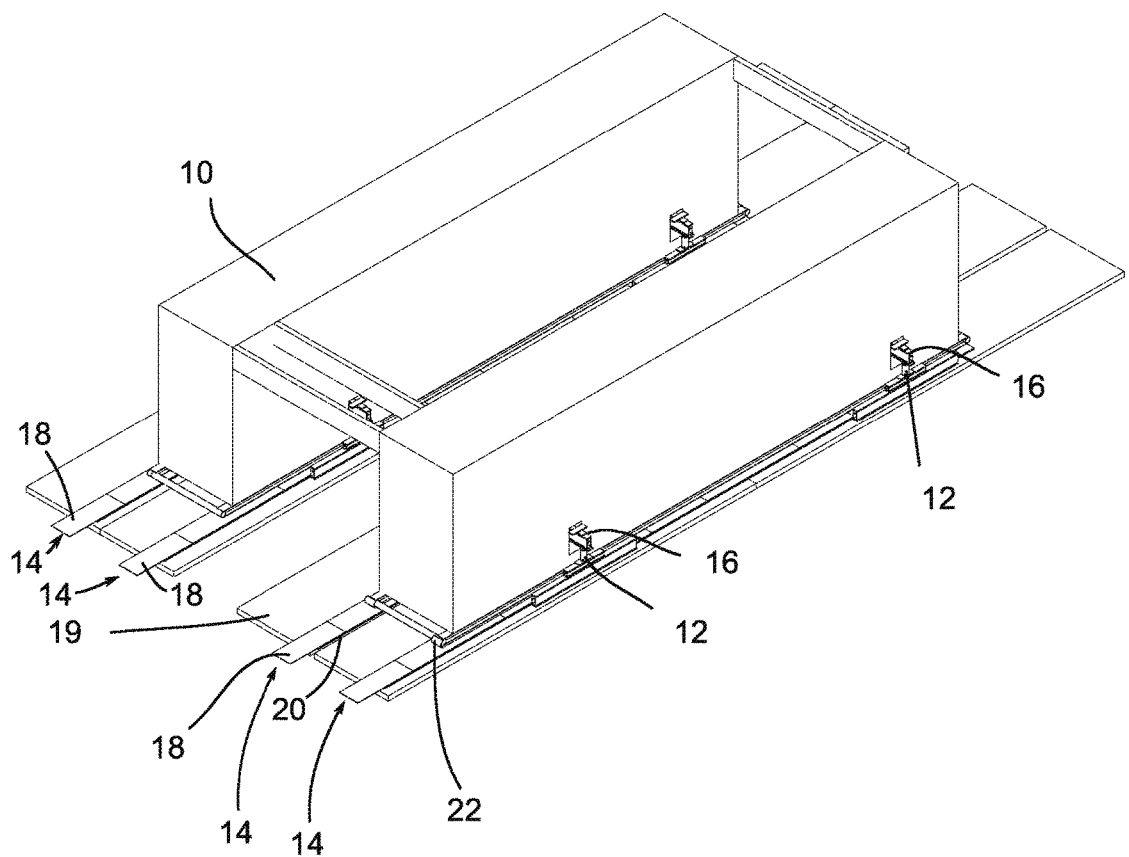
FIG. 1 is a perspective view of a portion of a rig structure resting on skid tracks.
Figure 2:
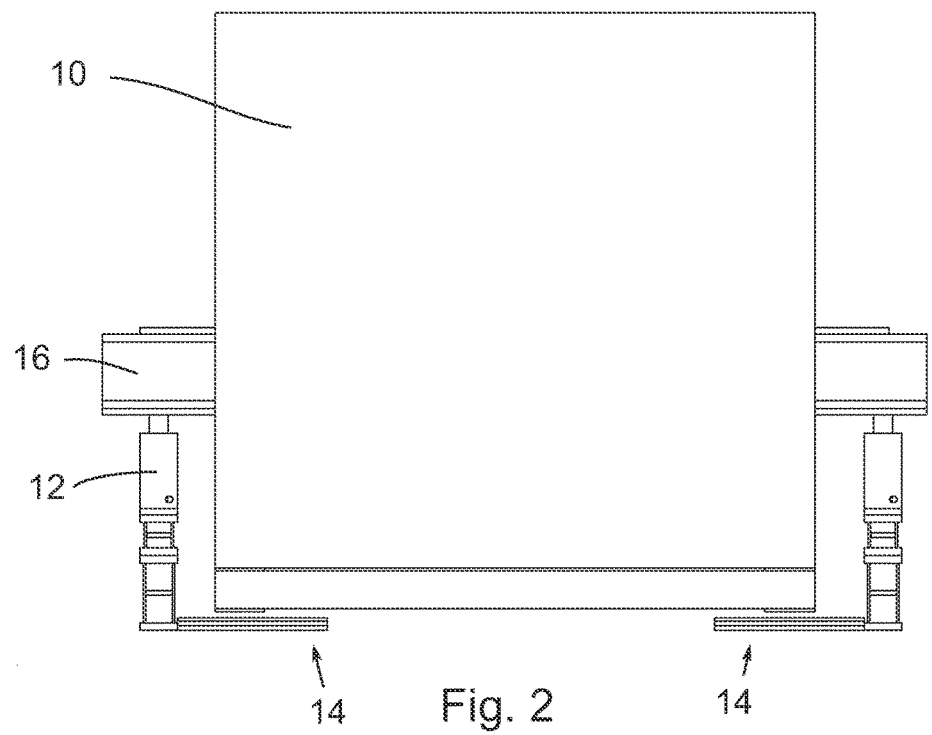
FIG. 2 is a front view of a portion of a rig structure raised on beams by jacks with skid tracks comprising a sliding layer and base placed underneath the structure.
Figure 3:
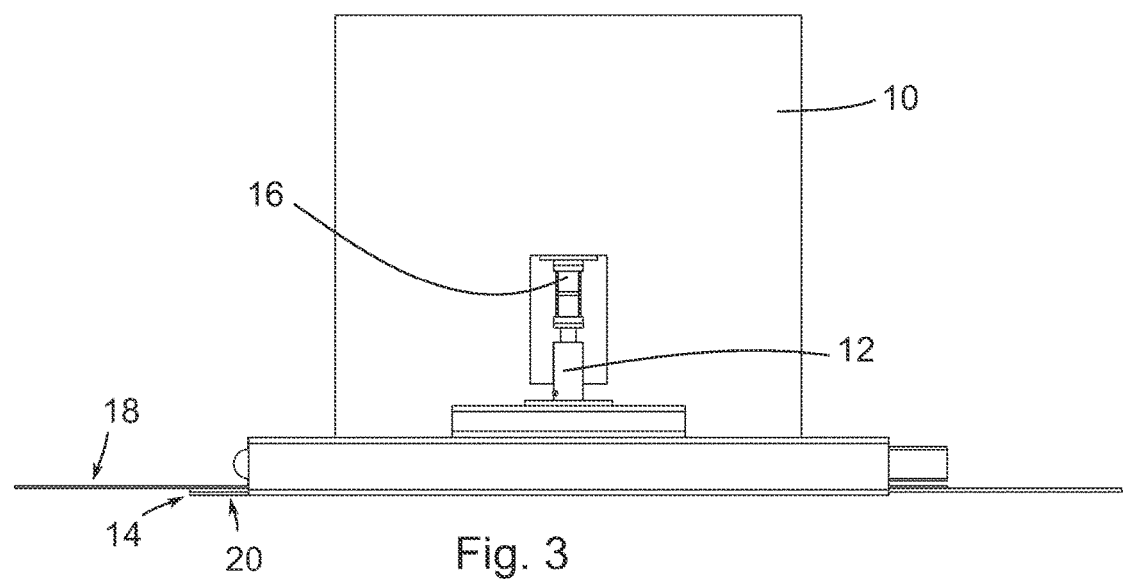
FIG. 3 is a side view of a portion of a rig structure raised on beams by jacks with skid tracks placed underneath the structure.

Once the rig structure 10 has arrived at the desired location, the rig structure 10 may be raised again upon the jacks 12 as shown in FIGS. 2 and 3, and the skid tracks 14 removed. The rig structure 10 can then be lowered, the jacks 12 removed, leaving the rig structure on the ground surface 19 again as shown in FIG. 9 after which rig operations may resume at this new location.

In an experimental design, a base layer 20 was made of high density hardwood (oak) plywood painted to reduce moisture and oil absorption was too brittle and would fracture when a raise pad was encountered. Therefore, it was found that a fracture resistant base layer 20 was needed, for example, ¾ inch cabinet grade fir plywood was found to have the required flexibility and strength. Other materials could also be used in place of the fir plywood having substantially the same or better fracture resistance. In the experimental design, a sliding layer 18 made of Jaytrex Virgin Natural White UHMW did not work well in higher temperatures (+25 C). It seemed to get a little "sticky." The Dry Slide UHMW by Quadrant Plastics was firmer at higher temperatures exhibiting less friction. Therefore, it is preferred to use a sliding layer 18 that is temperature resistant, namely that retains its sliding properties above 25 C, for example, up to 40 C. For the cooperating layer, it has been found that lighter stainless steel (18 gauge) did not disperse the weight at the edges of the load, reducing the effective surface area between the cooperating layer 22 and sliding layer 18. 16 gauge stainless steel has alleviated this issue. Therefore, it is preferred to use a cooperating layer 22 that is sufficiently flexible to be slid under the lifted drilling structure when it is lifted a very short distance, yet being bending resistant under the load of the drilling structure to disperse the weight of the drilling structure at the edges of the load and maximize the effective surface are of contact between the cooperating layer 22 and sliding layer 18.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of skidding a rig structure, the method comprising:
   raising the rig structure using jacks;
   after raising the rig structure, placing a skid track under the rig structure, wherein the skid track comprises a fracture resistant base layer, a low friction plastic sheet and a cooperating layer placed between the low friction plastic sheet and the rig structure, in which the low friction plastic sheet comprises a sheet of ultra-high-molecular-weight polyethylene;
   lowering the rig structure onto the skid track; and
   sliding the rig structure along the skid track.

2. The method of claim 1 further comprising upon sliding the rig structure to a desired location, raising the rig structure, removing the skid track from under the rig structure, lowering the rig structure, and removing the jacks.

3. The method of claim 1 in which the low friction plastic sheet is a dry lubricated plastic sheet.

4. The method of claim 1 in which the low friction plastic sheet is resistant against becoming sticky at 25° C.

5. A method of skidding a rig structure, the method comprising:
raising the rig structure using jacks;
after raising the rig structure, placing a skid track under the rig structure, wherein the skid track comprises a fracture resistant base layer, the fracture resistant base layer comprising plywood having at least a fracture resistance of ¾ inch cabinet grade fir plywood, a low friction plastic sheet and a cooperating layer placed between the low friction plastic sheet and the rig structure;
lowering the rig structure onto the skid track; and
sliding the rig structure along the skid track.

6. A method of skidding a rig structure, the method comprising:
raising the rig structure using jacks;
after raising the rig structure, placing a skid track under the rig structure, wherein the skid track comprises a fracture resistant base layer, a low friction plastic sheet and a cooperating layer placed between the low friction plastic sheet and the rig structure, in which the cooperating layer has at least a bending resistance of 16 gauge stainless steel;
lowering the rig structure onto the skid track; and
sliding the rig structure along the skid track.

7. The method of claim 6 in which the cooperating layer comprises a continuous flexible metal sheet.

8. The method of claim 7 in which the cooperating layer comprises stainless steel.

9. A method of skidding a rig structure comprising:
placing beams in a position to support the rig structure;
using jacks to raise the beams and rig structure;
placing a skid track under the rig structure, wherein the skid track comprises a fracture resistant base layer, a sliding layer placed on top of the fracture resistant base layer and a cooperating layer placed between the sliding layer and rig structure;
lowering the rig structure onto the skid track;
removing the jacks and the beams; and
sliding the rig structure along the skid track,
wherein the skid track comprises a low friction plastic sheet.

10. The method of claim 9 further comprising:
upon sliding the rig structure to a desired location, placing beams in a position to support the rig structure;
using jacks to raise the beams and rig structure;
removing the skid track from under the rig structure;
lowering the rig structure; and
removing the jacks.

11. The method of claim 9 wherein sliding the rig structure along the skid track comprises towing the rig structure along the skid track.

12. The method of claim 9 wherein the low friction plastic sheet is a dry self-lubricated plastic sheet being resistant against stickiness at 25° C.

13. The method of claim 12 wherein the low friction plastic sheet is a sheet of ultra-high-molecular-weight polyethylene.

14. The method of claim 9 in which the base comprises plywood having a fracture resistance of ¾ inch cabinet grade fir plywood.

15. The method of claim 9 in which the base comprises ¾ inch cabinet grade fir plywood.

16. The method of claim 9 in which the cooperating layer has at least a flexibility and bending resistance of 16 gauge stainless steel.

17. The method of claim 16 in which the cooperating sheet comprises stainless steel.

18. The method of claim 17 in which the metal sheet comprises 16 gauge stainless steel.

19. A method of skidding a rig structure comprising:
arranging jacks to be able to support the rig structure;
raising the rig structure with the jacks;
placing a skid track under the rig structure;
lowering the rig structure onto the skid track with the jacks;
removing the jacks; and
sliding the rig structure along the skid track,
wherein the skid track comprises a stainless steel metal sheet secured to move with the rig structure, a fracture resistant base and a low friction plastic sheet secured to the base between the stainless steel metal sheet and the base.

* * * * *